United States Patent [19]

Hasegawa et al.

[11] 3,911,103

[45] Oct. 7, 1975

[54] LIMONOATE DEHYDROGENASE AND DEBITTERING OF CITRUS PRODUCTS AND BY-PRODUCTS THEREWITH

[75] Inventors: Shin Hasegawa, Pasadena; Linda C. Brewster, Carson, both of Calif.

[73] Assignee: The United States of America as represented by the Secretary of Agriculture, Washington, D.C.

[22] Filed: Oct. 9, 1974

[21] Appl. No.: 513,362

Related U.S. Application Data

[63] Continuation of Ser. No. 394,239, Sept. 4, 1973, abandoned, which is a continuation-in-part of Ser. No. 250,764, May 5, 1972, abandoned.

[52] U.S. Cl. .................................... 426/51; 426/52

[51] Int. Cl.$^2$ .......................................... A23B 7/10

[58] Field of Search .................... 426/49, 51, 52, 61

[56] References Cited

UNITED STATES PATENTS

| | | | |
|---|---|---|---|
| 2,563,855 | 8/1951 | McColloch | 99/100 |
| 3,647,476 | 3/1972 | Swisher | 99/105 |

*Primary Examiner*—Norman Yudkoff
*Assistant Examiner*—Hiram H. Bernstein
*Attorney, Agent, or Firm*—M. Howard Silverstein; William E. Takacs

[57] ABSTRACT

Development of bitterness in citrus products and by-products is reduced by treatment with a previously-unknown enzyme, limonoate dehydrogenase. This enzyme is prepared by culture of *Arthrobacter globiformis* on a nutrient medium containing sodium limonoate.

4 Claims, No Drawings

LIMONOATE DEHYDROGENASE AND DEBITTERING OF CITRUS PRODUCTS AND BY-PRODUCTS THEREWITH

A non-exclusive, irrevocable, royalty-free license in the invention herein described, throughout the world for all purposes of the United States Government, with the power to grant sublicenses for such purposes, is hereby granted to the Government of the United States of America.

This is a continuation of our copending application Ser. No. 394,239, filed Sept. 4, 1973 and now abandoned, which in turn is a continuation-in-part of our application Ser. No. 250,764, filed May 5, 1972, now abandoned.

The enzyme described herein, limonoate dehydrogenase, and methods for preparing it are claimed in our copending application, Ser. No. 399,890, filed Sept. 24, 1973, which is a continuation-in-part of Ser. No. 323,466, filed Jan. 15, 1973, now abandoned, which in turn is a division of Ser. No. 250.764, filed May 5, 1972, now abandoned.

DESCRIPTION OF THE INVENTION

This invention relates, in general, to enzymic reactions and to the processing of citrus products and by-products, particularly citrus juices.

One object of the invention is to provide methods for treating citrus juices and other citrus products and by-products, whereby to prevent or at least reduce the development of bitterness therein.

Another object of the invention is to provide a new enzyme and methods for preparing the same, said enzyme being useful for improving the properties of citrus juices and other citrus products and by-products.

Further objects of the invention will be evident from the following description wherein parts and percentages are by weight unless otherwise specified. The abbreviation "ppm." used herein refers to parts per million.

The formulas given below depict several compounds pertinent to the invention. As will be more fully explained below, limonin (Formula I) is the compound responsible for bitterness in citrus juices, wherein it is formed from the non-bitter precursor, limonoate A-ring lactone (Formula II). The compound limonoic acid (Formula III) is a derivative of limonin, and may be prepared in known manner by alkaline hydrolysis of both lactone rings of the latter. The last compound, 17-dehydrolimonoate A-ring lactone (Formula IV) is the end product formed from limonoate A-ring lactone when citrus juice is subjected to the enzyme treatment in accordance with the invention.

Limonin (Formula I)

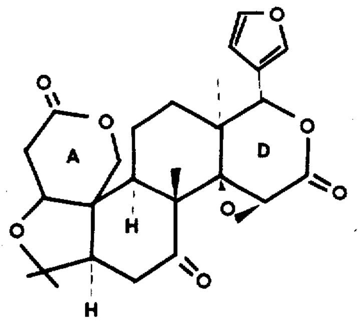

Limonoate A - ring lactone (Formula II)

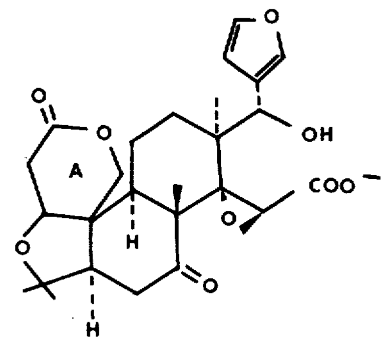

Limonoic Acid (formula III)

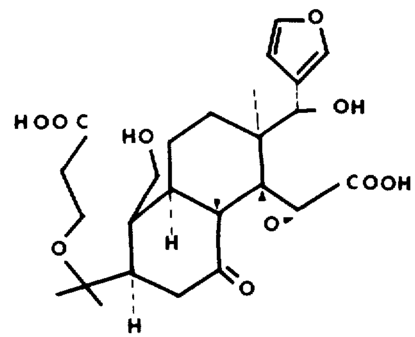

17-Dehydro-Limonoate A-ring lactone (Formula IV)

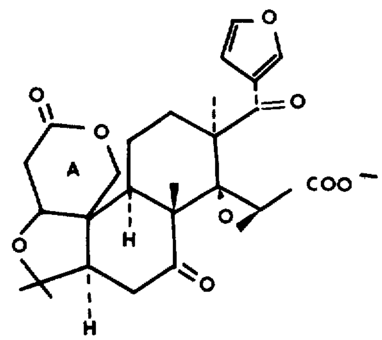

In the following description, the application of the invention to navel orange juice is stressed. It should be understood that this particular embodiment of the invention is provided by way of illustration and not limitation. In its broad ambit the invention is applicable to products and by-products from all kinds of citrus fruits, including oranges, lemons, grapefruit, tangerines, mandarins, limes, tangelos, citrus hybrids, and the like. Such products and by-products include juices, concentrates, purees, pulps, seed material, and the like.

Despite the abundance of high-quality navel oranges each year, very little of the fruit is consumed in the form of unblended navel orange juice. This is due to the fact that the juice from navel oranges becomes bitter soon after it is extracted from the fruit.

Heretofore, no practical method has been found to remove the bitterness from the juice or to prevent its formation. Early investigators observed that juice from late-season navel oranges tended to have less bitterness than juice from early-season fruit. Unfortunately, the low bitterness levels were reached very late in the harvest season, after most of the crop had been harvested. Other investigators attempted to simulate this natural debittering process by storing early-season navel oranges in warm, moist rooms. Although some debittering was achieved during prolonged storage, this approach had a number of serious drawbacks which prevented its commercialization. These disadvantages included the growth of molds and other microorganisms, the large amount of time required, the development of off-flavors, and the necessity for special storage rooms.

An object of the present invention is to obviate the problems outlined above. In accordance with the invention navel orange juice (or other citrus juice) is treated with a particular agent whereby to reduce the development of bitterness in the juice. The agent used in accordance with the invention is a hitherto-unknown enzyme, which we have named "limonoate dehydrogenase." This enzyme can also be designated by the systematic name "limonoate: NAD oxidoreductase." For the sake of brevity, the enzyme is herein referred to as limonoate dehydrogenase, or simply as LD.

The mechanism by which bitterness is developed in navel orange juice and the action of limonoate dehydrogenase on this mechanism are explained as follows:

The compound responsible for the bitter flavor in citrus juice is limonin. This bitter principle is produced, after the juice is extracted, in a manner represented by the following scheme

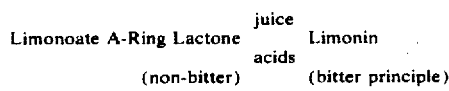

The non-bitter substance, limonoate A-ring lactone, occurs naturally in the fruit tissues where it is stable and remains non-bitter. However, when the fruit tissues are ruptured, as in juice extraction, this normally non-bitter substance is attacked by the juice acids and is converted into limonin. Because of its intense bitterness, only a very small amount of limonin is needed to render the juice unpalatable.

By reference to the preceding formulas, it will be seen that the reaction which causes bitterness is one of lactonization of the adjacent OH and COOH groups of the precursor, thereby forming a closed ring, namely, the one designated as D in Formula I.

In the process of the invention, limonoate dehydrogenase acts upon the limonin precursor (limonoate A-ring lactone), producing 17-dehydrolimonoate A-ring lactone as the end product. This compound is not bitter and is not convertible to limonin by any of the substances (chemical or biochemical) present in citrus juices. The net result is that the limonin precursor is effectively removed from the juice, whereby development of bitterness is prevented or at least substantially reduced.

Preparation of Limonoate Dehydrogenase

It may be pointed out first that limonoate dehydrogenase is a previously unknown enzyme, which exhibits the specific ability of forming 17-dehydro derivatives from limonoids. For example, it converts limonoate A-ring lactone into 17-dehydrolimonoate A-ring lactone. It also converts limonoic acid, or its salts, into 17-dehydrolimonoate. The formula of the latter compound is like that shown in IV above, except that the A-ring is open. It may also be noted that the enzyme has optimum activity at a pH of about 9.5.

Limonoate dehydrogenase requires for its action the presence of nicotinamide-adenine nucleotide (NAD). That is, NAD must be present in the reaction mixture as a hydrogen acceptor in order for the enzyme to exert its dehydrogenating action. Substitution of nicotinamide-adenine dinucleotide phosphate (NADP) for NAD in the reaction mixture results in no activity of the enzyme. Consequently, this enzyme is classified as a limonoate:NAD oxidoreductase. It should be noted that it is not essential to add NAD when orange juice or other citrus products or by-products (except products from seeds) are treated with the enzyme in order to prevent the development of bitterness. There is a sufficient amount of NAD naturally present in these citrus materials so that the enzyme can act on the bitterness precursor (LARL). However, if desired, NAD can be added to expedite the desired reaction.

It has been found that zinc ion increases the activity of limonoate dehydrogenase. Since zinc ion is present in the medium used to prepare the enzyme, this ion is incorporated into the enzyme and it is not required to add any further zinc ion when the enzyme is used to prevent the development of bitterness in citrus juices and the like. However, addition of zinc ion might be used to increase the rate of debittering.

Limonoate dehydrogenase is further characterized by its greater stability in neutral and alkaline solutions than in acidic solutions. For example, the enzyme retains 50% of its original activity at 46° C. when held for 5 minutes at pH 7, whereas no activity is retained at pH 3.5 under these conditions and only 6% of the activity is retained at 23° C. at pH 3.5.

In accordance with the invention, limonoate dehydrogenase is prepared by culturing *Arthrobacter globiformis* on a nutrient medium containing limonoate ion. The critical ingredient of the medium is the limonoate ion, and this may be supplied by limonoic acid or its alkali metal salts, the sodium salt being preferred. The other ingredients of the medium are those conventionally used in culturing bacteria. Thus, as conventional in the art, the medium contains an assimilable carbon source, an assimilable nitrogen source, and mineral salts. The assimilable carbon source is, as noted above, provided by limonoate ions. The nitrogen source is provided by inorganic salts such as alkali metal nitrates, ammonium salts, or an organic compound such as urea. The minerals are typically provided by a small proportion (about 0.1 to 0.5%) of an alkali metal phosphate and trace amounts of soluble compounds of magnesium, iron, molybdenum, zinc, copper, manganese, and boron.

The culture is conducted under aerobic conditions and at a temperature conventionally used in culturing microorganisms and is preferably from about room temperature (25°C.) to about 35° C. One may use conventional shake-flask techniques for small runs. For larger-scale operation it is preferred to carry out the culture in a tank, applying agitation and aeration to the inoculated liquid medium, that is, to conduct the culture under submerged aerated conditions.

In a typical embodiment of the invention, an aqueous nutrient medium containing about from 0.1 to 2% of sodium limonoate is inoculated with a culture of *A. globiformis*. The inoculated medium is then cultured under aerobic conditions for a period of 24 to 96 hours, depending on such factors as temperature, concentration of nutrients, and the like. The cells containing the enzyme can be collected by centrifugation, washed, and frozen until used. For further separation the cell cake may be allowed to stand at room temperature to cause autolysis of the cellular material, or the cells can be disrupted by physical means. On centrifuging the autolysate, the limonoate dehydrogenase activity will then be in the liquid fraction. This liquid fraction may be further purified by conventional techniques used in the purification of enzymes, for example, dialysis, precipitation with salts, column chromatography, etc.

The preparation of limonoate dehydrogenase is further demonstrated by the following illustrative example.

Assay Method: Limonoate dehydrogenase activity was assayed by following the increase in absorbancy at 340 mμ due to formation of dihydronicotinamide adenine dinucleotide (NADH) from nicotinamide adenine dinucleotide (NAD) added to the reaction system as a hydrogen acceptor. In particular, activity was assayed in 1 ml. of a reaction mixture consisting of $10^{-2}$ M of Na-limonoate, 0.07 M Tris buffer at pH 9.5, $5 \times 10^{-4}$ M of NAD and 1–4 m unit of enzyme. The reaction was carried out at 23° C. in a standard silica gel cuvette with 1-cm. light path. One unit of limonoate dehydrogenase is defined as the amount which catalyzes the production of 1 μmole of 17-dehydrolimonoate per minute under the above conditions. (The term "Tris" used herein is an abbreviated name for tris-(hydroxymethyl) aminomethane.)

EXAMPLE 1

A mineral salt solution containing the following ingredients was prepared:

| | | | |
|---|---|---|---|
| $KH_2PO_4$ | 0.20 gm. | $Fe_2(SO_4)_3.6H_2O$ | 0.054 mg. |
| $K_2HPO_4$ | 0.15 gm. | $(NH_4)P(Mo_3O_{10})_4$ | 0.024 mg. |
| $NaH_2PO_4.H_2O$ | 2.00 gm. | $ZnSO_4.7H_2O$ | 0.050 mg. |

-continued

| | | | |
|---|---|---|---|
| $Na_2HPO_4$ | 1.50 gm. | $CuSO_4.5H_2O$ | 0.0025 mg. |
| $NH_4NO_3$ | 0.60 gm. | $MnSO_4$ | 0.0055 mg. |
| $NaNO_3$ | 3.80 gm. | $H_2BO_3$ | 0.057 mg. |
| $MgSO_4.7H_2O$ | 0.30 gm. | $H_2O$ | 1000 ml. |

Into a 2-liter Erlenmeyer flask was placed 400 ml. of the above solution plus sodium limonoate to provide a concentration of 1%. The resulting medium was inoculated with 10 ml. of a 48-hour culture of *A. globiformis*. The inoculated medium was shaken at room temperature for 72 hours. The cells were collected by centrifugation at 10,000 X g for 10 minutes, washed twice with cold 0.1 M potassium phosphate buffer at pH 7.0, and kept frozen until used.

Frozen cells were suspended in 10 volumes of cold 0.1 M phosphate buffer at pH 7.5 containing $10^{-2}$ M of dithiothreitol, and disrupted by a French press. After centrifugation at 20,000 X g for 10 minutes, the supernatant was brought to 90% saturation with $(NH_4)_2SO_4$ by the addition of solid salt with continuous stirring and was placed on an ice bath for 1 hour. The resulting precipitate was collected by centrifugation at 20,000 X g for 10 minutes, and dissolved in a minimum portion of 0.1 M potassium phosphate buffer, pH 7.5, containing $10^{-2}$ M dithiothreitol. The solution was then dialyzed for 2 hours against 0.05 M potassium phosphate buffer at pH 7.5 containing $10^{-4}$ M of dithiothreitol. (This buffer solution was gassed with nitrogen just prior to the dialysis.) The enzyme can be used in this form or can be further purified as below.

The dialysate was then applied onto a 1.5 × 25 cm. jacketed diethyl-aminoethyl-cellulose (DEAE-cellulose) column which had been equilibrated with 0.01 M Tris buffer at pH 8.0. The column, which was maintained at 4° C., was eluted with a linear gradient formed between 150 ml. of 0.01 M Tris buffer at pH 8.0 and 150 ml. of the same buffer containing 1.0 M NaCl. The effluent was collected in 4-ml. fractions. Fractions 29–38, which contained enzyme activity, were dialyzed in a manner similar to the one used previously and fractionated again on a 1.5 × 25 cm. DEAE-cellulose column. The column was eluted in a manner similar to the first column except that this time the elution was at pH 7.0. Enzyme activity was found in fractions 38–46. The overall purification gave a 68-fold increase in activity over the crude extract and 55% of the original activity was recovered.

EXAMPLE 2

Effect of Divalent Cations on LD Activity

A reaction mixture consisting of $10^{-2}$ M Na-limonoate, 0.07 M Tris buffer at pH 9.5, $5 \times 10^{-4}$ M NAD, and 1 m unit of LD was prepared.

To a 1-ml portion of this reaction mixture was added a quantity of zinc chloride ($ZnCl_2$) such that the $ZnCl_2$ concentration was $10^{-3}$ M. The resultant mixture was incubated at 23° C. in a standard silica cuvette with 1-cm. light path. The initial rate (activity) was determined spectrophotometrically by measuring the increase in absorbance due to the formation of hydrogenated nicotinamide-adenine nucleotide (NADH) at 340 mμ.

The above procedure was repeated with substitution of either calcium chloride ($CaCl_2$), magnesium chloride ($MgCl_2$), manganese chloride ($MnCl_2$), or ethylenediaminetetraacetic acid (EDTA) in place of $ZnCl_2$.

In a similar manner the activity of the initial reaction mixture (control) without the presence of any divalent cations was determined. All activities are expressed relative to the value for this control and are summarized in the following table.

| Ions | Concentrations (M) | Relative activity |
|---|---|---|
| $ZnCl_2$ | $10^{-3}$ | 144 |
| $CaCl_2$ | $10^{-3}$ | 105 |
| $MgCl_2$ | $10^{-3}$ | 100 |
| $MnCl_2$ | $10^{-3}$ | 95 |
| EDTA | $10^{-3}$ | 100 |
| Control | — | 100 |

DEBITTERING OF CITRUS JUICES

In accordance with this aspect of the invention, citrus juice is treated with limonoate dehydrogenase (hereinafter referred to as LD) in order to reduce or eliminate the formation of bitterness in the juice. In the preferred practice of the invention the enzyme is applied to the juice without delay after its extraction from the fruit. The point is that LD is only effective on the limonin precursor (limonoate A-ring lactone) which has an open D-ring, rather than on limonin itself, in which both A- and D-rings are closed. In freshly prepared juices, most of limonin precursor is present as such and thus available for dehydrogenation by the enzyme. Where it is planned to subject the juice to a heat treatment (as in canning or concentration or drying), the process of the invention should be applied to the juice prior to such heating operation.

In conducting the debittering treatment of the invention the juice may be at its natural pH, or, for faster results, it may be adjusted to a pH of about 5.5–9.5. The pH adjustment may be accomplished by adding food-grade sodium hydroxide or other food-grade alkali. Next, LD is added in a quantity sufficient to reduce the limonin precursor content to the level desired. Only a minor proportion of the enzyme is required. For example, in many cases useful results are obtained with the use of about 0.1 to 50 units of enzyme per 100 grams of juice. If a completely non-bitter juice is desired, the precursor level should be reduced to about 5–8 ppm. In the case of a juice with a high concentration of LARL or where rapid reduction of LARL is desired, more units of LD may be used. Thus, it is within the compass of the invention to employ greater than 50 units of enzyme per 100 grams of juice. The content of limonin precursor can be monitored during the treatment by withdrawing aliquots, converting the precursor to limonin by boiling the juice in an acidic state, and then analyzing for limonin by known procedures.

More complete utilization of LD can be realized by the addition of nicotinamide adenine dinucleotide (NAD) in a quantity equivalent to or some fraction of the molar amounts of limonin precursor in the juice. The addition of NAD is, however, not essential and the debittering proceeds well without its addition.

The time required for the debittering treatment depends on such factors as the pH, the amount of LD used and the temperature. Generally, the debittering is complete within 20 minutes to 24 hours. The debittering can be conducted at temperatures from 0° to 35° C., more time being required at the lower temperatures. Usually for convenience, the reaction is conducted at room temperature (about 25° C.).

In the case of citrus products and by-products already containing limonin (such as ground seed products or heated or stored juice, concentrate, pulp, or peel products) it is necessary to first treat the product with alkali to achieve pH 7 or higher in order to hydrolyze the D-ring of limonin before or simultaneously with the LD debittering treatment.

After the limonin precursor content has been reduced to the level desired (and when the pH of the juice has been initially increased), the juice is acidified to its original pH with an appropriate amount of a food-grade acid, such as citric, acetic, malic, fumaric, hydrochloric, phosphoric, and the like. The use of organic acids, especially citric, is preferred as they do not result in saltiness as do the inorganic acids. It may be desired to balance the salt formed with added sugar. It is, of course, obvious that if the juice is treated at its natural pH, the pH restoration step is unnecessary.

Following the enzyme treatment, the juice may be used directly or subjected to the usual preservation methods such as canning, concentration, dehydration, or freezing.

The debittering procedure of the invention is further demonstrated by the following illustrative examples.

EXAMPLE 3

Navel orange juice was divided into a series of lots. Each lot was then treated as follows:

The pH was adjusted to a predetermined level by addition of sodium hydroxide. A measured quantity of LD was added and in some cases NAD was also added. The mixture was incubated at room temperature for 17 hours, except in the case of Lots 9 to 11 where the time was varied.

After the enzyme treatment was completed, aliquots of various lots and untreated samples (controls) were acidified and boiled for 15 minutes to convert all the limonin precursor to limonin. The limonin content of each was determined by specific thin-layer chromatographic assay. Taking into account the limonin contents of the treated samples and that of the controls, the effectiveness of each treatment was calculated.

The conditions used and the results obtained are summarized below.

| Lot No. | Reaction conditions: pH | Time, hrs. | LD added, units per 100 g. juice | NAD added, micromoles per 100 g. juice | Results: Limonin, ppm. | Effectiveness % |
|---|---|---|---|---|---|---|
| Control | — | — | — | — | 16 | — |
| 1 | 9.5 | 17 | 0.85 | 0 | 4.2 | 74 |
| 2 | 9.5 | 17 | 0.85 | 2.5 | 0.5 | 97 |
| Control | — | — | — | — | 16.2 | — |
| 3 | 7.5 | 17 | 0.85 | 0 | 6.2 | 62 |
| 4 | 7.5 | 17 | 0.85 | 2.5 | 3.0 | 81 |
| Control | — | — | — | — | 18 | — |

-continued

| Lot No. | Reaction conditions pH | Time, hrs. | LD added, units per 100 g. juice | NAD added, micromoles per 100 g. juice | Results Limonin, ppm. | Effectiveness % |
|---|---|---|---|---|---|---|
| 5 | 6.5 | 17 | 3.5 | 0 | 11 | 39 |
| 6 | 6.5 | 17 | 3.5 | 2 | 4 | 78 |
| 7 | 6.5 | 17 | 3.5 | 5 | 3 | 83 |
| 8 | 6.5 | 17 | 3.5 | 10 | 2 | 89 |
| Control | — | — | — | — | 16.2 | — |
| 9 | 9.5 | 20 min. | 0.85 | 2.5 | 11.2 | 31 |
| 10 | 9.5 | 40 min. | 0.85 | 2.5 | 8.8 | 46 |
| 11 | 9.5 | 17 | 0.85 | 2.5 | 0.5 | 97 |

EXAMPLE 4

Freshly prepared navel orange juice was divided into a series of lots. Each lot was treated as follows:

One lot was adjusted to a predetermined pH level by the addition of sodium hydroxide. Another lot received no pH adjustment, thus remaining at the natural pH of the juice. Measured quantities of LD (purified by $(NH_4)_2SO_4$ precipitation and dialysis, but no DEAE column separation) and NAD were added to each lot. The mixture was incubated at room temperature for 2 hours.

After the enzyme treatment was completed, the various lots and untreated samples (controls) were acidified and boiled for 15 minutes to convert all the limonin precursor to limonin. The limonin content of each was determined by specific thin-layer chromatographic assay. Taking into account the limonin contents of the treated samples and that of the controls, the effectiveness of each treatment was calculated.

The conditions used and the results obtained are summarized below.

| Lot No. | pH | Reaction conditions Time, hrs. | LD added, units per 100 g. juice | NAD added, micromoles per 100 g. juice | Results Limonin, ppm. | Effectiveness, % |
|---|---|---|---|---|---|---|
| Control | — | — | — | — | 15.8 | — |
| 1 | 5.5 | 2 | 19.0 | 6.0 | 4.2 | 73 |
| 2 | Natural juice pH | 2 | 19.0 | 6.0 | 6.7 | 58 |

EXAMPLE 5

Navel orange peel was ground with water in a blender to form a slurry. The slurry was divided into a series of lots. Each lot was then treated as follows:

Two lots were adjusted to a predetermined pH level by the addition of sodium hydroxide. The other lots received no pH adjustment, thus remaining at the natural pH of the slurry. Measured quantities of crude LD (prepared by $(NH_4)_2SO_4$ precipitation and dialysis, but no DEAE column separation) were added to each lot and in some cases NAD was added. The mixture was incubated at room temperature for one hour.

After the enzyme treatment was completed, all samples were acidified, heated and analyzed for limonin content as in Example 3. Taking into account the limonin content of the treated samples and that of the controls, the effectiveness of each treatment was calculated.

The conditions used and the results obtained are summarized below.

| Lot No. | pH | Reaction conditions Time, hrs. | LD added, units per 100 g. juice | NAD added, micromoles per 100 g. juice | Results Limonin, ppm. | Effectiveness, % |
|---|---|---|---|---|---|---|
| Control | — | — | — | — | 52.1 | — |
| 1 | 5.6 | 1 | 12.0 | 100 | 37.2 | 29 |
| 2 | 8.0* | 1 | 12.0 | 100 | 21.9 | 58 |
| 3 | 8.0* | 1 | 12.0 | 0 | 26.6 | 49 |

*pH adjusted with sodium hydroxide.

EXAMPLe 6

Lemon seeds which had been soaked overnight in water were ground. The resulting slurry was filtered through 2 layers of cheesecloth. The filtrate was divided into a series of lots. Each lot was then treated as follows:

The pH was adjusted where indicated to a predetermined level by addition of sodium hydroxide. A measured quantity of LD was added and in some cases NAD was also added. The mixture was incubated at room temperature for 1 hour.

After the enzyme treatment was completed all samples were acidified, heated and analyzed for limonin content as in Example 3. Taking into account the limonin content of the treated samples and that of the control, the effectiveness of each treatment was calculated.

| Lot No. | pH | Reaction conditions Time, hrs. | LD added, units per 100 g. slurry | NAD added, micromoles per 100 g. slurry | Results Limonin, ppm | Effectiveness, % |
|---|---|---|---|---|---|---|
| Control | — | — | — | — | 93.3 | — |
| 1 | 6.1 | 1 | 31 | 250 | 86.8 | 7 |
| 2 | 7.5* | 1 | 31 | 250 | 33.3 | 64 |
| 3 | 7.5* | 1 | 31 | 0 | 80.0 | 14 |

*pH adjusted with sodium hydroxide.

Having thus described the invention, what is claimed is:

1. A process for reducing the development of bitterness in a citrus material selected from the group consisting of citrus products and by-products which contain the limonin precursor, limonoate A-ring lactone, said process comprising a. incorporating with the said citrus material the enzyme limonoate dehydrogenase, which enzyme is produced by culturing *Arthrobacter globiformis* on a nutrient medium containing limonoate ions, which has the specific ability of converting limonoate A-ring lactone into 17-dehydrolimonoate A-ring lactone, which exhibits optimum activity at a pH of about 9.5, and which requires for its activity the presence of nicotinamide-adenine nucleotide, and b. incubating the said citrus material at a temperature and for a time sufficient to inactivate a substantial proportion of the limonin precursor contained in the citrus material.

2. A process for reducing the development of bitterness in a citrus juice which contains the limonin precursor, limonoate A-ring lactone, said process comprising a. adding to the juice a minor proportion of the enzyme limonoate dehydrogenase, which enzyme is produced by culturing *Arthrobacter globiformis* on a nutrient medium containing limonoate ions, which has the specific ability of converting limonoate A-ring lactone into 17-dehydrolimonoate A-ring lactone, which exhibits optimum activity at a pH of about 9.5, and which requires for its activity the presence of nicotinamide-adenine nucleotide, and b. incubating the juice at a temperature and for a time sufficient to inactivate a substantial proportion of the limonin precursor contained in the juice.

3. The process of claim 2 wherein the citrus juice is Navel orange juice.

4. Citrus juice which contains the limonin precursor, limonoate A-ring lactone, said juice having incorporated therewith the enzyme limonoate dehydrogenase, which enzyme is produced by culturing *Arthrobacter globiformis* on a nutrient medium containing limonoate ions, which has the specific ability of converting limonoate A-ring lactone into 17-dehydrolimonoate A-ring lactone, which exhibits optimum activity at a pH of about 9.5, and which requires for its activity the presence of nicotinamide-adenine nucleotide, said enzyme being added in an amount sufficient to reduce the development of bitterness in said juice.

* * * * *